June 28, 1966  C. M. HUNTER  3,257,846
TRUE AIR SPEED INDICATOR
Filed Feb. 15, 1965  2 Sheets-Sheet 1
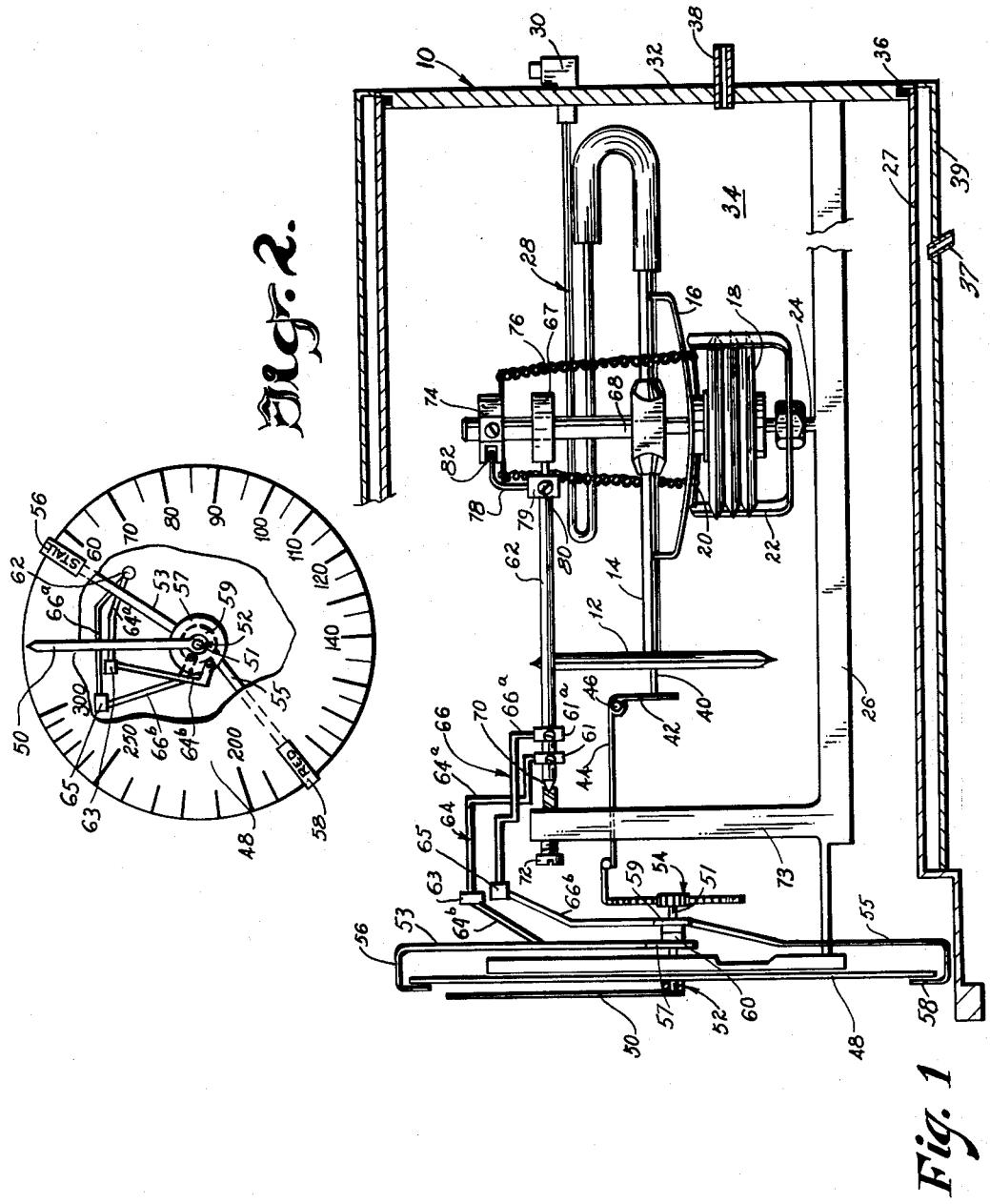
INVENTOR.
CECIL M. HUNTER
BY William S. Dorman
ATTORNEY June 28, 1966  C. M. HUNTER  3,257,846
TRUE AIR SPEED INDICATOR Filed Feb. 15, 1965  2 Sheets-Sheet 2

INVENTOR.
CECIL M. HUNTER
BY William S. Dorman
ATTORNEY

United States Patent Office 3,257,846
Patented June 28, 1966

3,257,846
TRUE AIR SPEED INDICATOR
Cecil M. Hunter, P.O. Box 7055, Tulsa, Okla.
Filed Feb. 15, 1965, Ser. No. 432,738
4 Claims. (Cl. 73—182)

This invention relates to improvements in speed indicating instruments and, more particularly, but not by way of limitation, to an instrument particularly designed and constructed for providing a direct reading or indication of the true air speed of an aircraft in flight, and this application is a continuation-in-part of my co-pending application Ser. No. 230,098, filed Oct. 12, 1962, and entitled True Air Speed Indicator, now abandoned.

The true air speed of an airplane may be defined as the speed of the craft flying through a body of air at any altitude or any temperature. The true air speed is equal to the indicated air speed plus the corrections for altitude, or barometric pressure plus (or minus) temperature, and in short it may be said that the true air speed is a flow measurement of the density of the air mass surrounding the aircraft. It is considered desirable or necessary to establish the true air speed of an airplane during flight for many reasons. The results of trim, power settings and propeller adjustments are often best ascertained in speed by the true air speed of the aircraft. For example, the propeller angle is adjusted for best performance as related to the density of the air and the horsepower driving the propeller. This is because the blade takes a larger bite or deeper angle in low density air than in high density air at the same horsepower. The most common method in use today for determining the true air speed of a flying craft is through the utilization of an instrument wherein the readings or speeds directly indicated thereon are not corrected for pressure or temperature variances during flight. These instruments are commonly known as indicated air speed devices, and are usually operated by the actual outside dynamic pressure and the static pressure that is surrounding and lifting the airplane via pilot tube connections. The readings thus ascertained are more closely related to pressure than to speed, and as a result the speeds indicated thereby provide a true speed indication or reading only at sea level and at a standard temperature. In order to determine the true air speed of this airplane, it is necessary for the pilot to use the indicated speed readings in combination with other factors, and through proper computations arrive at the true air speed.

Furthermore, the dial or face of these indicated speed instruments is informally provided with means for identifying the stall speed and the established maximum speed (often called the "red-line speed") determined by the aircraft manufacturer. The means for identifying these critical speeds are usually permanent lines or various colors which are applied directly to the face or dial of the instrument, and as a result the speeds thus identified are not changed during the flight of the aircraft. In actual practice, however, these critical speeds vary in accordance with the true speed of the craft, and may not be the same at all for varying altitudes and temperatures. Thus, the critical speeds visible to the pilot during operation of the aircraft with the use of present day instruments of this type, may or may not be correct according to the actual flight conditions.

The present invention contemplates a novel speed indicator instrument wherein the true air speed of the aircraft may be read directly from the face of the instrument, thus eliminating the necessity of providing an indicated speed type instrument, and the corresponding computing problems associated therewith. The novel instrument is provided with a temperature sensitive member adapted to cooperate with a pressure sensitive means for automatically adjusting the indicating arms or needles in accordance with the pressure and temperature of the surrounding body of air. In addition, the critical speeds are indicated by movable fingers or arms which are automatically adjusted to the proper relationship with the true speed of the aircraft. Thus, the true air speed of the craft in addition to the property related stall speed and maximum speed may be read by the pilot directly from the face of the instrument without the necessity of further calculations.

The novel true air speed indicator instrument is of a simple construction, and substantially any well known indicated speed type of instrument may be readily modified to provide the correction for temperature and pressure as disclosed in the present invention, thus providing an economy of installation for aircraft already provided with these devices.

It is, therefore, an important object of this invention to provide a speed indication instrument for aircraft wherein the true air speed thereof during flight may be ascertained by a direct reading from the face of the instrument.

It is another object of this invention to provide a novel true air speed indicator instrument wherein the critical speeds of the aircraft are automatically adjusted in accordance with the true air speed of the craft to provide direct readings thereof from the face of the instrument.

Another object of this invention is to provide a novel true air speed indicator instrument wherein substantially any well known indicated speed type of instrument may be readily modified to provide the correct compensation for pressure and temperature, thus providing an economy of installation and reducing wastage of presently available devices.

Still another object of this invention is to provide a novel true air speed indicator instrument wherein the true air speed of an aircraft during flight may be readily ascertained without addition calculations or computations.

It is still another object of this invention to provide a novel true air speed indicator instrument which is simple and efficient in operation and economical and durable in construction.

Other and further objects and advantageous features of the present invention will hereinafter more fully appear in connection with a detailed description of the drawings in which:

FIGURE 1 is a sectional elevational view of an instrument embodying the invention.

FIGURE 2 is a front elevational view of the face of an instrument embodying the invention, and depicting a portion thereof broken away for purposes of illustration.

Figure 4:
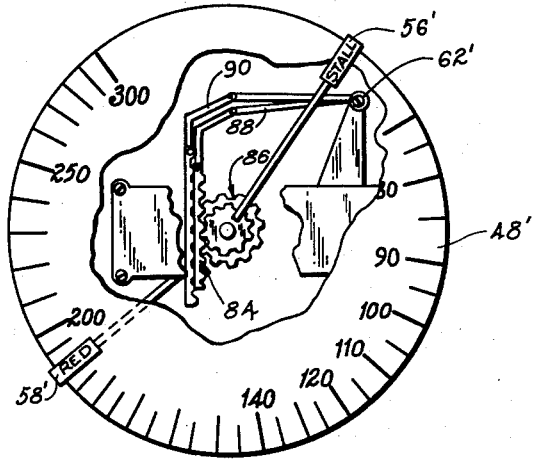
FIGURE 4 is a view similar to FIGURE 2 depicting the face of the modified instrument shown in FIGURE 3.

Referring to the drawings in detail, reference character 10 generally indicates a true air speed indicator instrument comprising a suitable bellows 12 which may be of any well known type as frequently utilized in the usual indicated speed type instrument of today. The bellows 12 is preferably removed from the frame of the usual indicated speed instrument and is secured to a metallic tube 14 in any well known manner. The bellows 12 may be secured to the shaft or tube 14 at a slight angle or cocked with respect thereto, if desired. The tube 14 is preferably constructed from stainless steel tubing, but not limited thereto, and is supported by a bimetal temperature sensitive cradle member 16 which is rigidly or firmly secured to a second bellows member or pressure responsive element 18 in any well known manner, such as by the connection member 20. The bellows 18 is carried by a frame or guide member 22, which in turn is secured to a guide stem 24. The stem 24 is integral with or secured to a frame 26 which supports the instrumentation for a purpose as will be hereinafter set forth.

The tube 14 is connected to a Pitot tube (not shown) normally provided on the exterior of the aircraft (not shown) such as the wing thereof, through a suitable flexible tubing arrangement as indicated generally at 28, and the elbow connection member 30. The connection member 30 extends through a rear cover plate 32 which closes one end of the housing 27 to provide a closed interior chamber 34 surrounding the bellows members 12 and 18 and associated parts. It is preferable to provide an O-ring sealing member 36 between the cover 32 and housing 27 for precluding leakage of air therebetween. The interior chamber 34 is open to the pressure surrounding the aircraft by a suitable static connection member 38, as is well known, and since the chamber 34 is sealed from other exterior pressures, the internal pressure thereof will be substantially equal to the barometric pressure surrounding the aircraft regardless of the altitude thereof. It will thus be apparent that the exterior surfaces of the bellows 12 and 18 are subjected to the pressure existing within the chamber 34, whereas, the interior of the bellows 12 is open to the pressure from the Pitot tube through the tubing 28 and tube 14. A cold blast of air is brought in from the outside of the aircraft in any well known manner, such as tubing 37 and a jacket member 39 or the like to flow around the housing 27 of the instrument 10 so that the temperature in the chamber 34 will be affected, and the cradle member 16 will be surrounded by an air mass of substantially the same temperature as that existing exteriorly of the airplane.

The bellows 12 is expanded in accordance with the internal pressure transmitted thereto from the Pitot tube, as is well known. In addition, the bellows 18, being precharged internally follows the outside pressure present within the chamber 34, and the cradle 16 follows the temperature gradient within the chamber 34. The cradle 16 is preferably designed and constructed so as to curve upwardly under warm temperature conditions and to curve downwardly under cold temperature conditions.

A finger or bumper bar 40 is carried by the bellows member 12, and is oppositely disposed from the tube 14, as clearly shown in FIG. 1. The bar 40 rests against a pivotal lever member 42 having an arm member 44 extending forwardly therefrom at substantially right angles with respect thereto. The lever 42 is constantly urged against the bumper bar 40 in any suitable manner, such as by spring tension (not shown) and any left or right hand movement of the bumper bar 40, as viewed in FIG. 1, will pivot the lever arms 42 and 44 about the pivot point 46 thereof.

A dial or face member 48 is provided at the forward end or left hand end of the frame 26, as viewed in FIG. 1, and is secured therein in any suitable manner (not shown). A speed indicating needle 50 is rotatably secured with respect to the face or dial 48 by suitable bearing and shaft members, as generally indicated at 52, and as commonly used in present day indicated speed type instruments. In addition, the needle 50 is in communication with the lever arm 44 through suitable connection members, such as lever members or gears, or the like, as commonly utilized in the indicated speed type instruments, and generally indicated at 54, whereby pivoting of the lever arms 42 and 44 will be transmitted to the needle 50 in such a manner that the needle 50 will be rotated with respect to the dial 48. The dial 48 is provided with indicia thereon, as clearly shown in FIGURE 2, indicating the speed at which the aircraft is traveling during flight. The position of the needle 50 with respect to the dial 48 will provide a visual reading or indication of the speed at which the aircraft is traveling, as is well known in speed indicating instruments.

The bumper bar 40 is moved fore and aft, or toward and away from the dial 48, by the expansion and contraction of the bellows 12, and is raised and lowered by the cooperation between the expansion contraction of the bellows 18 and the flexing or curving of the cradle 16 due to temperature variances. In this manner, the position of the bumper bar 40 with respect to the lever arm 42 will be automatically adjusted in accordance with the pressure and temperature of the air mass surrounding the aircraft as well as the pressure conditions being admitted to the bellows 12 from the Pitot tube. It will be readily apparent that the position of the bar 40 against the lever 42 will control the degree of angle of pivoting thereof and the leverage percentage differentials of the pivoting will be in a logarithmic progression. The pivoting of the lever 42 is transmitted to the needle 50 by the interconnecting members 54 and 52. In this manner, the rotation of the needle 50 with respect to the dial 48 may be automatically adjusted or controlled in accordance with the air mass surrounding the aircraft during flight. The ratio of turn or pivoting of the lever 42 is increased with altitude and temperature the correct amount to offset Pitot pressure falloff resulting from density of air. This gives a true air speed reading on the dial 48 by the needle 50 at all times during flight of the craft.

As hereinbefore set forth, the critical speeds of the airplane are also important, and it is desirable to establish these speeds in correct relation to the actual or true air speed of the aircraft. In order to accomplish this, at least two fingers 56 and 58 are movably disposed around the outer periphery of the dial 48 in a manner as will be hereinafter set forth. One of the fingers, for example, finger 56, may be suitably inscribed, or color coded to indicate the stall speed for the aircraft, whereas another finger, such as the finger 58, may be suitably identified for indicating the red-line or maximum speed of the craft.

The finger 56 and 58 are provided with radially extending arms 53 and 55, respectively, which terminate at their inner ends in base plate members 57 and 59 respectively. The plates 57 and 59 are journalled or otherwise disposed on the shaft 51 for rotation thereabout in any suitable manner and are preferably spaced apart by suitable divider bearings 60 whereby each arm 53 and 55 and respective fingers 56 and 58 work or rotate independently. The plates 57 and 59 are rotated or driven by the rotation of a shaft 62 through the connecting linkages 64 and 66 respectively. The shaft 62 is rotatable about the longitudinal axis thereof in a manner as will be hereinafter set forth.

The linkage assemblies 64 and 66 may be of any suitable type and as depicted herein, the assembly 64 comprises a first link member 64a secured to the shaft 62 in any well known manner such as a collar 61 for rotation simultaneously with the shaft 62. A link arm 64b is pivotally secured at one end to the link member 64a by the swivel joint 63 and the opposite end is pivotally secured to the base plate 57 of the arm 53. The linkage assembly 66 is generally similar to the linkage assembly 64 and comprises a first link member 66a secured to the shaft 62 in any well known manner such as a collar 61a for rotation simultaneously therewith. A link arm 66b is pivotally secured at one end to the link 66b at the swivel joint 65 and the opposite end is pivotally secured to the base plate 59 of the arm 55. It will be apparent from an inspection of the drawings that the linkage assemblies 64 and 66, although of a generally similar construction or arrangement, are of differing dimensions or lengths and are in spaced relationship for a purpose as will be hereinafter set forth.

The arms 53 and 55 work or rotate about the shaft 51 on different ratios as established by the points where the link arms 64b and 66b are connected to the base plate members 57 and 59. Of course, rotation of the arms 53 and 55 moves the fingers 56 and 58 around the outer periphery of the dial 48 on different ratios corresponding to the ratios of the respective arm members. As particularly shown in FIGURE 2, the radial distance between the axis of rotation of the plates and the connection points of the respective link arms are different, thus resulting in different ratios of rotational movement for the arms 53 and 55 as the shaft 62 rotates. In addition, it may be necessary to make small adjustments in the distances of the connecting points or swivel joints 63 and 65 with relation to the pivotal axis of the shaft 62. This may be done at the connection of the link members 64a and 66a with their respective collars 61 and 61a to establish the desired ratios for operation of the arms 53 and 55 and respective fingers 56 and 58. For example, as shown in FIGURE 2, the link arm 66b is secured closer to the axis of the spindle 51 than is the link arm 64b. Therefore, the arm 55 and finger 58 will move through a greater distance than the arm 53 and finger 56 upon rotation of the shaft 62.

As hereinbefore set forth, the shaft or pivot rod 62 is rotatable about the longitudinal axis thereof and rotation of the shaft 62 is transmitted to the linkage assemblies 64 and 66 by the collars 61 and 61a. When the shaft 62 rotates about its longitudinal axis in one direction, the linkage assemblies 64 and 66 "pick up" the base plates 57 and 59 which are thus rotated about the shaft 51 and in turn cause the arms 53 and 55 and respective fingers 56 and 58 to rotate with respect to the dial 48. The rotation of the shaft or rod 62 in an opposite direction, of course, will reverse the rotational movement of the plates 57 and 59.

The shaft or pivot rod 62 is suitably secured to an apertured member 67 which is a portion of the frame 26. A center post 68 carried by the cradle 16 extends through the member 67 and is slidable therein. The member 67 functions as a guide for keeping the center post 68 in proper vertical position. The shaft 62 is pivotally connected at 70 to a centering member or screw 72 extending through a support post 73 which is integral with or secured to the frame 26. A slotted collar 74 is secured to the upper end of the center post 68 and is constantly urged in a direction toward the bellows 18 by suitable spring members 76. An arm member 78 is secured to a block or collar 79 which is secured to one side of the pivot rod 62 by a screw 80, or the like, in any well known manner whereby vertical movement of the arm 78 transmits rotation to the shaft 62 through the block 79. One end of the arm 78 is disposed in the slotted portion 82 of the collar 74, as clearly shown in FIGURE 1. The cap or collar member 74 is alternately raised or lowered by the expansion and contraction of the bellows 18 in combination with the flexing of the temperature cradle 16, and the raising and lowering of the collar 74 is transmitted to the shaft 62 through the arm 78 and block 79 whereby the shaft 62 is rotated about the pivot point 70. This rotation is in turn transmitted to the arms 56 and 58 by the arms 64 and 66, respectively, thereby moving the fingers 56 and 58 around the outer periphery of the dial 48. This provides the proper temperature and altitude correction for the positioning of the fingers 56 and 58, thus providing a visual indication of the critical or limitation speeds of the aircraft as properly related to the true air speed as shown by the needle 50 at all times during the operation of the craft. This will substantially eliminate the need for the indicated speed type instruments, and provide a pilot with a visual and direct reading of all the speed information necessary to fly safely and correctly.

MODIFIED STRUCTURE

Figure 3:
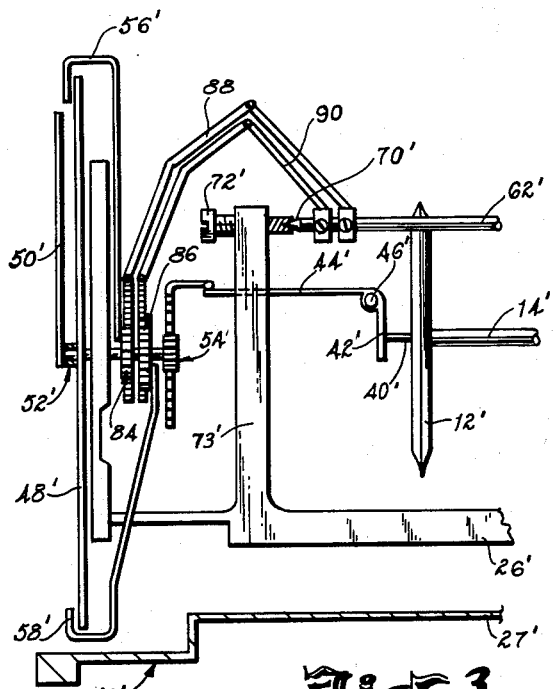
FIGURE 3 is a sectional elevational view of a portion of a modified instrument embodying the invention.

Referring now to FIGURES 3 and 4, the instrument generally indicated at 10' is substantially the same as that hereinbefore set forth in the preferred embodiment. However, the fingers 56' and 58' are connected to the pivot shaft 62' in a slightly different manner. The arms 56' and 58' may be suitably journalled around the shaft of rotation of the needle 50' whereby the arm 56' is rotated through the action of a rack and pinion mechanism 84 and the arm 58 is rotated through the action of a rack and pinion mechanism 86. The rack members of the devices 84 and 86 are in turn connected to the pivot shaft 62 in any suitable manner, such as by linkage members 88 and 90, respectively. The rack and pinion mechanisms 84 and 86 may be selected with the desired ratio to provide the proper rotation of the respective fingers 56' and 58', thus providing the difference in ratio therebetween as hereinbefore set forth in the preferred embodiment. As the pivot shaft 62' is rotated in response to pressure and temperature variances, the rack and pinion devices 84 and 86 are actuated for orientation of the fingers 56' and 58' with respect to the dial 48', thus indicating therein the proper critical speeds in relation to the true air speed of the aircraft.

By way of summary, the present invention provides a novel true air speed indicator instrument wherein the needle 50' thereof is rotated with respect to the dial 48' to indicate the speed of the aircraft during flight. The rotation of the needle is controlled by the pivotal action of the lever arms 44' and 42', and the degree of turning of these lever arms is regulated by the positioning of the bumper bar 40' with respect to the arm 42'. The bumper arm 40' is raised and lowered and moved forward and rearward in accordance with the pressure and temperature conditions of the air mass surrounding the aircraft during flight, taking into consideration the Pitot pressure conditions. In addition, the critical speed indication fingers 56' and 58' are moved around the outer perphery of the dial 48' in accordance with pressure and temperature conditions existing exteriorly of the aircraft, thus providing a true indication of the critical speeds of the airplane in the proper relation to the true air speed thereof.

From the foregoing, it will be apparent that the present invention provides a novel true air speed indicator instrument wherein the true air speed of an aircraft during flight can be ascertained visually by direct readings from the face of the instrument. In addition, the critical speeds of the airplane which are necessary to determine to assure a safe and correct flight operation thereof are readily available at all times during flight, and are constantly corrected to indicate the proper relationship thereof to the true air speed of the airplane. Thus, the pilot is provided with necessary flight speed information without the necessity of further computations, and the necessity of providing an indicated speed type instrument is eliminated. The novel instrument is simple and efficient in operation, and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

What is claimed is:

1. In an air speed indicator instrument, a speed indicator dial having speed indicating hand means in combination therewith actuating means for rotating the hand means relative to the dial, an internal chamber surrounded by air brought in from the outside whereby the temperature within the chamber is substantially equal to the temperature of the outside air, a first bellows mounted in the chamber and responsive to altitude variations and barometric pressure for expanding and contracting vertically as related to altitude, a temperature responsive bimetal cradle disposed in the chamber and movable by the first bellows, an air speed bellows disposed on the bimetal cradle and expandable and contractable horizontally by Pitot pressure, a bumper bar carried by the air speed bellows, said bumper bar being in engagement with the hand actuating means for actuation thereof, said bimetal cradle acting in response to the air temperature present in the chamber in combination with the altitude pressure bellows for moving the bumper bar vertically with respect to the hand actuating means to provide leverage percentage differentials of actuation thereof whereby said speed indicator hand means indicates true air speed readings on the speed indicator dial.

2. In an air speed indicator instrument, the improvements as set out in claim 1 and including critical speed indicating means, and means actuating said critical speed indicating means with respect to the speed indicator dial whereby the critical speeds indicated thereby are adjusted in accordance with the variable pressure and temperature conditions.

3. In an air speed indicator instrument, a speed indicator dial having a speed indicating hand means in combination therewith, said speed indicating hand means including a pivotal lever arm for actuation thereof, an internal chamber surrounded by air brought in from the outside whereby the temperature within the chamber is substantially equal to the temperature of the outside air, a first bellows mounted in the chamber and responsive to altitude variations and barometric pressure for expanding and contracting vertically as related to altitude, a temperature responsive bimetal cradle disposed in the chamber and movable by the first bellows, an air speed bellows disposed on the bimetal cradle and expandable and contractable horizontally by Pitot pressure, a bumper bar carried by the air speed bellows, said bumper bar in engagement with the pivotal lever member for pivoting thereof to actuate the speed indicating hand means, said bimetal cradle acting in response to the air temperature present in the chamber in combination with the altitude pressure bellows for moving the bumper bar vertically with respect to the pivotal lever member to provide leverage percentage differentials therefor whereby said speed indicator hand means indicates true air speed reading on the speed indicator dial.

4. In an air speed indicator instrument, the improvements as set forth in claim 3 and including critical speed indicating means, and means actuating said critical speed indicating means with respect to the speed indicator dial whereby the critical speeds indicated thereby are adjusted in accordance with the variable pressure and temperature conditions.

References Cited by the Examiner

UNITED STATES PATENTS

| | | | |
|---|---|---|---|
| 2,424,511 | 7/1947 | Stanley | 73—182 |
| 2,537,240 | 1/1951 | Shaw | 73—182 |
| 2,563,207 | 8/1951 | Bevins | 73—182 |
| 2,638,782 | 5/1953 | Leach | 73—182 |
| 2,842,091 | 7/1958 | Kennedy | 116—129 |
| 3,104,547 | 9/1963 | Suits | 73—181 |
| 3,126,737 | 3/1964 | Gibbs | 73—181 |

OTHER REFERENCES

"Sonic Speed Warnings," Flight, pp. 579, 580, 585, June 19, 1947.

LOUIS R. PRINCE, *Primary Examiner.*

DONN McGIEHAN, *Assistant Examiner.*